United States Patent Office 3,476,612
Patented Nov. 4, 1969

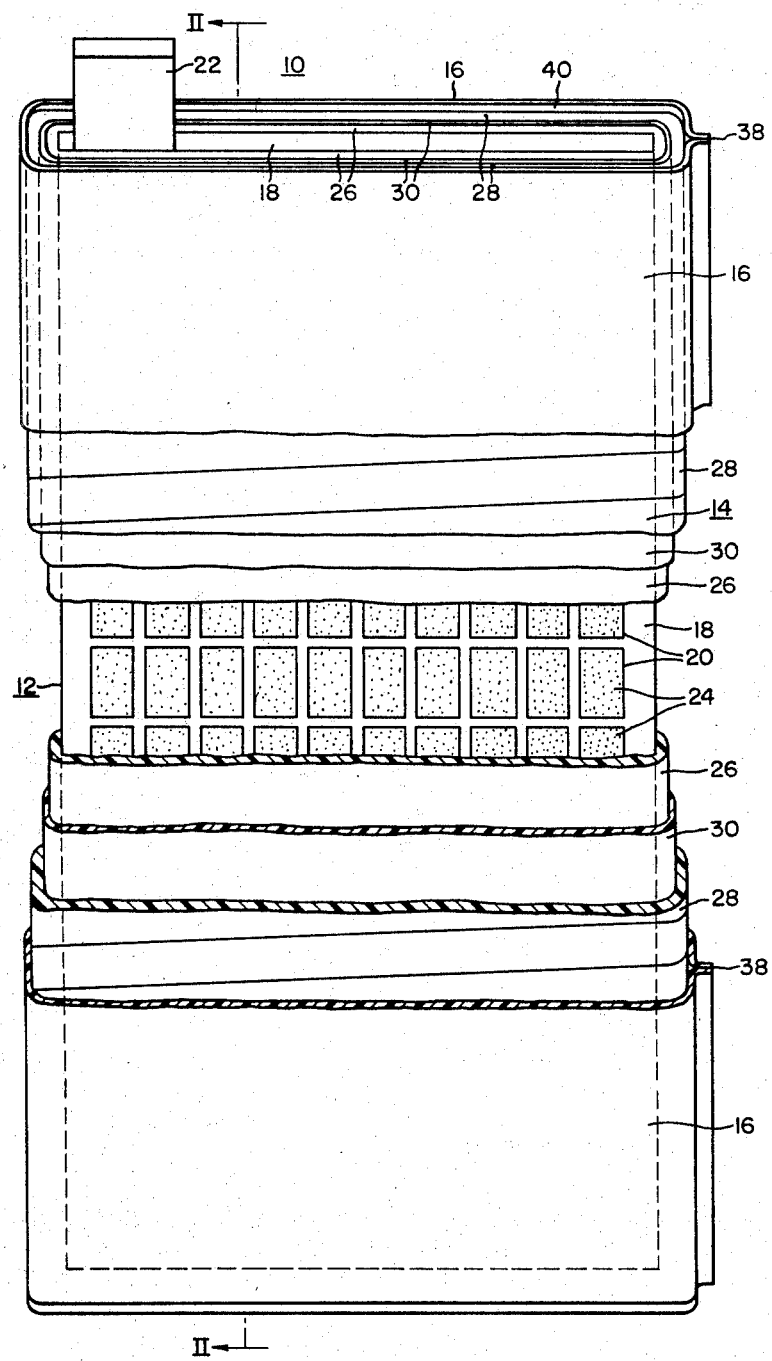

3,476,612
STORAGE BATTERY PLATE INSULATION
John R. Tench, Mount Lebanon, Pittsburgh, Pa., assignor to Westinghouse Electric Corporation, Pittsburgh, Pa., a corporation of Pennsylvania
Filed Dec. 21, 1966, Ser. No. 603,617
Int. Cl. H01m 3/02
U.S. Cl. 136—147                                    5 Claims

ABSTRACT OF THE DISCLOSURE

A lead-acid battery plate having a coating of active material on opposite surfaces, a layer of electrically insulating padding on the coatings, and an electrically insulating shroud shrunk into a tight fit to enclose the layer of padding, the shroud being composed of highly porous and resilient material and being heat shrinkable, whereby the layer of padding is compressed and held tautly in place against the active material.

BACKGROUND OF THE INVENTION

Field of the invention

This invention relates to storage batteries and in particular it pertains to lead-acid batteries.

Description of the prior art

The placement of thin porous separators between the alternating positive and negative plates in cells of storage batteries greatly reduces the tendency of plates to buckle and short circuit. The primary object of the separators was to permit electrolytic conduction between plates of opposite polarity while preventing metallic conduction between the plates. Various types of separators have been developed including wooden separators, perforated and slotted hard rubber separators, microporous rubber separators, and fibrous glass mats.

Associated with the foregoing has been the problem of holding the active material ($PbSO_4$ and $PbO_2$) on the positive plate. During the use of a storage battery the active material on the plates changes its chemical composition during successive charging and discharging cycles. As a result of chemical change together with other circumstances such as shock or vibration during its use, a portion of the active material usually becomes dislodged and settles as useless sediment at the bottom of the cell, thereby shortening the useful life of a battery. In any event, the capacity of a storage battery is lessened as the active material drops off. Consequently, an originally oversize, battery may be needed to supply device requirements over a period of time for a particular operation. At times the build up is sufficient to short circuit the negative and positive plates and complete failure occurs. Rather heavy lead plates have been required in order to produce a battery suitable for use over a long period of time in accordance with present practice.

To prevent the particles of active material from separating from the plates, perforated retainers or envelopes are sometimes used with the plates to hold the active material on the positive plates. Perforated retainers or envelopes are usually composed of rubber or glass fiber in the form of mats or sheets which are sufficiently porous to not interfere with the conductivity between the acid and the active material.

A disadvantage of such retainers or envelopes has been that they prematurely lose their shape and/or elastically resulting in a loose fit between the retainer and the active material. For that reason the retainers do not in fact adequately serve their intended purpose during the entire life of a battery. Indeed, the retainers may hasten the disintegration an separation of particles of active material from the battery plate because gases that develop during normal charging of the battery rise to the surface in the clearance space between the retainer and the active material on the plates and with a force sufficient to agitate the particles of active material loose from their position.

Another difficulty associated with the separation of particles of active material from the positive plate is that some of the particles become suspended in the electrolyte and are carried to the edges of the negative plate where they build-up to eventually form a bridge between the next adjacent positive plates and thereby cause a short circuit.

SUMMARY OF THE INVENTION

In accordance with this invention it has been found that the foregoing problems may be overcome by providing an improved retainer providing insulation for the active material on positive plates of a storage battery which holds the active material particles securely in place during the entire life of the battery. The retainer or insulator includes a bag or envelope composed of heat shrinkable and porous material which is heat shrunk tightly about each plate so as to tautly hold an inner sleeve of electrical insulating padding in close and firm contact against the active material on the positive plate which padding has the properties of porosity, resilience, and inertness. Accordingly, it is a general object of this invention to provide a storage battery insulation for battery plates composed of a heat shrinkable and porous material.

It is another object of this invention to provide improved storage battery insulation particularly for the positive plate of a storage battery for holding the active material in place.

It is another object of this invention to provide a storage battery insulation for preventing the mechanical disintegration and breaking away of the active material on the positive plate by holding the particles in place and allowing gases to escape through the insulation.

It is another object of this invention to provide a storage battery insulation that prevents active material falling off, thereby reducing the accumulation of sediment at the bottom of the battery cell and, so that its capacity is relatively constant and a smaller storage battery may be employed for a given requirement and a smaller cell may be prepared having less space below the plates. It is another object of this invention to provide a storage battery insulation that permits the employment of a greater surface area of positive material ($PbO_2$) to electrolyte because of the use of more positive plates having thinner cross sections than plates of prior constructions for the same cell size.

Finally, it is an object of this invention to accomplish the foregoing objects and desiderata in a simple and effective manner.

Briefly, the present invention accomplishes the foregoing objects by providing a battery plate insulator comprising a retainer for holding a coating of active material substantially permanently on the surface of the plate, the insulator comprising (1) at least one layer of padding of a porous, resilient insulation such as glass fiber disposed in close contact with and covering the active material, and (2) a heat shrinkable shroud enclosing the layer of padding so that the latter is compressed and permanently held tautly in place against the active material, the shroud composed of an inert, porous, resilient material which has the property of being heat shrinkable to the shroud dimension.

BRIEF DESCRIPTION OF THE DRAWING

For a better understanding of the nature and objects of this invention, reference is made to the drawings, in which:

FIG. 1 is a perspective view of a shrouded positive plate of a battery cell broken away in portions showing various layers of an insulator enclosing the plate; and FIG. 2 is a vertical sectional view taken on the line II—II of FIG. 1.

DESCRIPTION OF THE PREFERRED EMBODIMENT

In accordance with the invention a shrouded battery plate is generally indicated at 10 in FIGS. 1 and 2. It includes a battery plate 12, an inner layer of padding 14 of inert material and an outer shroud in the form of a bag or envelope 16. The inner layer of padding 14 is in the form of a flat untwisted member such as roving.

For lead-sulfuric acid batteries the plate 12, of the positive type, is composed of a metal grid 18 having a plurality of pockets or openings 20 disposed in a repetitive pattern to form a grid 18. The upper end of the plate includes an electrical contact lug 22 of a conventional nature. The plate also includes a paste of an active material 24 of lead dioxide (PbO$_2$) disposed within the openings 20 of the grid 18. The paste of active material 24 is the primary active material of the positive plate 10 and reacts with the sulphuric acid electrolyte to form lead sulfate so as to cooperate with a similarly disposed active electrode material primarily of sponge lead on the negative plate of the battery to produce the desired electrical current. The plate 12 with grid 18 is composed of lead or an alloy thereof.

The padding 14 is composed of one or more layers 26 and 28 of porous material having resilence and inertness to the acid and reaction products between the acid and the plate. The layers 26 and 28 are preferably composed of glass fiber or resinous fiber and are applied in the form of elongated strips of tape which are firmly rounded on the grid portion 18. The padding 14 may also include a sheet 30 of porous material such as fiber glass mat or plastic fiber mat and the layer 26 of padding may be bonded at interface 32 to the inner surface of the sheet 30 to facilitate the application of the inner layer 26.

The outer layer 28 of padding may likewise be composed of an elongated tape which is applied by wrapping the tape around the plate after sheets 30 have been placed on opposite sides of the plate 12. A preferred manner of application of the padding 14 is to take a sheet 30 of glass fiber mat as wide as the plate 12 and twice as long as the grid with a layer 26 of glass fiber padding bonded to one side thereof and apply the bonded sheet 30 and layer 26 to both sides of the plate 12 by folding the sheet 30 around the lower end at 34 of the plate 12. The outer layer 28 of the padding is then applied by wrapping the tape from side to side around the assembled sheet and mat in a direction lateral to the longitudinal axis of the plate. Thus the folding of sheet 30 at 34 prevents particles from dropping down from the plates with tape layer 38 prevents lateral escape of particles of active material.

After the padding is in place the shroud 16 is slipped over the plate to encase the overall assembly of the plate 12 and padding 14. The shroud 16 is composed of a heat shrinkable sheet material which is in the form of a bag dimensioned to fit closely to the opposite sides of the assembled plate 12 and padding 14. The shroud 16 is closed at the bottom, as by heat sealing along the lower end 36, and it may be heat sealed as well as along one edge 38 if made from a single sheet of overlapped material. The upper end of the shroud 16 is open at 40 to receive the plate 12.

The shroud 16 is composed of sheet-like material having a high surface porosity of 92 to 98% and having the property of being heat shrinkable. For that purpose after the plate 10 is shrouded, by assembling the plate 12, padding 14, and shroud 16, it is heated such as by passing through a heat tunnel or oven at a temperature ranging from 250° F. to 500° F. and preferably at 400° F. to cause the shroud 16 to shrink in place about the padding. The shroud 16 may be composed of any of a suitable material such as heat shrinkable polypropylene resin, polyethylene resin, or polyester fibers. Other heat shrinkable fibers are known. The plastic threads or fibers are assembled and woven, bonded, or pressed together to form the sheet-like material. Such heat shrinkable fibrous materials are well known and are commercially available. The shroud 16 may also be composed of a sheet of film having a multitude of microapertures.

In the heat shrunk state the shroud 16 fits tightly on and around the padding 12 which is thereby held tautly and compressed against the opposite surfaces of the plate 12. The material of which the shroud and padding as well as the sheet 30 is inert to the acid electrolyte of the battery. The resilient and flexible fibers of the padding 14 are held continuously against the active material 24 on the plate. As a result there is little if any clearance space into which the loosened particles of active material may move from their original positions and therefore only negligible amounts of active material such as lead sulphate can be displaced from the plate. As a result the plate has a greater life.

Moreover, inasmuch as the padding 14 is held tightly against the opposite surfaces of the active material there is no clearance between the padding and the surfaces through which gases generated during charging of the plate can rise but the gases are forced to escape laterally into the electrolyte outside the plate. Thus, the source of agitation of the particles of active material is eliminated. Because of this, very small particles of material can not be carried by rising gas to the upper end of the plate from which they could be subsequently attracted to the negative plate. This eliminates the possibility of an accumulation at the edges thereof to bridge the positive and negative plates.

The following example is illustrative of the present invention:

EXAMPLE

An industrial lead-acid battery was made by placing positive and negative lead plates in a battery cell jar of a prior conventional construction. The positive plates were ⅜ inch thick, 5 11/16 inches wide, and 17¼ inches long, as compared with prior plate dimensions for the same cell of ¼ inch thick, 5 11/16 inches wide, and 16½ inches long. The new negative plates were ⅛ inch thick, 5 11/16 inches wide, and 17¼ inches long as compared with prior plate dimensions of 3/16 inch thick, 5 11/16 inches wide, and 16½ inches long. Furthermore, the spacing between the new plates was ½ inch as compared with ¾ inch spacing between prior plates. Because of the reduced dimensions for each plate, a greater number of plates was placed in a given cell jar. In this case the cell jar dimensions were 6¼" x 5⅛ x 20½" and 19 plates were disposed within the cell as compared to 13 plates previously.

Each positive plate in this battery having active electrode material in the grids thereof applied in accordance with standard practice, was prepared by placing a U-shaped padding sheet of resilient glass fibers bonded to a glass mat sheet of a width of 5 11/16 inches and a total length of 34½ inches, the U-bend being at the lower end of each plate. Then ½ inch wide flattened glass fiber roving was wrapped in overlapping turns from side to side of the plate. The applied padding was approximately ¼ inch thick. Finally, the padded plate was inserted into a shroud composed of matted heat shrinkable polypropylene fibers of a wall thickness of about 5 mils, in the form of a pocket of dimensions of about 18 inches by 6 inches, with only the top being open. The assembly was then placed in an oven and heated to 4000° F. whereupon the shroud of polypropylene fibers shrunk into a tight fit and compacted the padding closely against the active electrode material. The negative electrode plate with its applied active material may be simply wrapped with a layer of the flattened glass roving and the shroud placed thereover and heat shrunk into place. The positive and negative electrode plates were assembled alternately with a permeable molded spacer between them.

Accordingly, the shrouded battery plate construction of the present invention provides a new and novel means for satisfying prior existing problems by holding the active material particles in place on the surfaces of the negative plate and by permitting gases evolved during cycling of the battery to escape through the padding and shroud at their areas of origin instead of rising to the upper end of the plate along zones directly adjacent to the active material surfaces. During cycling of a battery the lead oxide ($PbO_2$) is converted to lead sulphate ($PbSO_4$) of larger volume. This is one of the reasons for the breakdown of the paste of active material during operation of the battery. By maintaining a slight pressure on the active material the particles remain in place and do not dislocate and drop to the bottom of the jar to form useless sediment.

It is understood that the above-specification and drawings are merely exemplary and not in limitation of the invention.

What is claimed is:

1. A battery plate insulator for a battery plate having a coating of active material on opposite surfaces thereof, having opposite edges along the surfaces and adapted to be disposed in an electrolyte, the insulator comprising at least one layer of electrically insulating padding composed of porous resilient material which is inert to the electrolyte, the layer of padding covering the faces of the battery plate and retaining the active material in place on the plate, and an electrically insulating encircling shroud disposed over the padding on opposite surfaces and extending around the opposite edges and being heat shrunk into a tight fit to enclose the layer of padding, the shroud being composed of a highly porous and resilient material and having the property of being heat shrinkable such property having been employed in making the battery plate insulator, whereby the layer of padding is compressed and held tautly in place against the active material.

2. The battery plate insulator of claim 1 in which the padding is composed of at least one of a material selected from the group consisting of glass fibers and plastic fibers.

3. The battery insulator of claim 1 in which the padding is composed of one of the materials selected from the group consisting of heat shrinkable polypropylene, polyethylene, and polyester fibers having a porosity of at least 80%.

4. The battery plate insulator of claim 1 in which the shroud is composed of a material which is heat shrinkable in a temperature ranging from 250° to 500° F.

5. The battery plate insulator of claim 1 in which the shroud is composed of one of the materials selected from the group consisting of polypropylene and polyethylene, and in which the padding is composed of a glass fiber.

References Cited

UNITED STATES PATENTS

| | | | |
|---|---|---|---|
| 1,990,976 | 2/1935 | Booss | 136—147 |
| 2,168,366 | 8/1939 | Slayter | 136—147 |
| 2,490,630 | 12/1949 | Jardine | 136—147 |
| 2,647,157 | 7/1953 | Booth | 136—147 |
| 2,851,509 | 9/1958 | Di Pasquale et al. | 136—6 |
| 3,207,632 | 9/1965 | Dickover et al. | 136—16 |
| 3,253,954 | 5/1966 | Banas | 136—54 |

FOREIGN PATENTS

| | | |
|---|---|---|
| 791,108 | 2/1958 | Great Britain. |

WINSTON A. DOUGLAS, Primary Examiner

A. SKAPARS, Assistant Examiner